March 30, 1954 L. KARNIOL 2,673,372
TWO-STEP PROCESS FOR MOLDING ARTICLES WITH ORNAMENTAL FACING
Original Filed March 17, 1942
3 Sheets-Sheet 1

INVENTOR
Leopold Karniol
BY
Emery, Varney, Whittemore & Dix

March 30, 1954     L. KARNIOL     2,673,372
TWO-STEP PROCESS FOR MOLDING ARTICLES WITH ORNAMENTAL FACING
Original Filed March 17, 1942     3 Sheets-Sheet 2

INVENTOR
Leopold Karniol
BY
Emery, Varney, Whittemore & Dix

March 30, 1954     L. KARNIOL     2,673,372
TWO-STEP PROCESS FOR MOLDING ARTICLES WITH ORNAMENTAL FACING
Original Filed March 17, 1942     3 Sheets-Sheet 3

INVENTOR
Leopold Karniol
BY
Emery, Varney, Whittemore & Dix

Patented Mar. 30, 1954

2,673,372

UNITED STATES PATENT OFFICE 2,673,372

TWO-STEP PROCESS FOR MOLDING ARTICLES WITH ORNAMENTAL FACING

Leopold Karniol, New York, N. Y.

Substituted for abandoned application Serial No. 435,053, March 17, 1942. This application December 22, 1950, Serial No. 202,251

6 Claims. (Cl. 18—59)

This invention relates to the manufacture of ornamental molded articles consisting of a body portion and an ornamental facing, and has for an object the provision of improvements in this art.

One object of the invention is to simultaneously provide a plurality of articles with facings consisting of surface layers.

Another object of the invention is to simultaneously secure uniform ornamental facings on a plurality of molded articles pressed in multiple-dies so that the ornamental facing in each unit will be accurately disposed in a predetermined manner to the end that, when desired, each unit will be identical with every other unit.

Another object of the invention is to simultaneously press on a plurality of articles a plurality of facings in such a manner that the whole assembly becomes a unit, so that the extraction of the articles out of the mold is simplified, that the operations subsequent to the molding operation are facilitated, and that the type of operations required in some cases may be altered.

Another object of the invention is to simultaneously provide a plurality of facing mediums which register accurately with the mold cavities of a multiple-die.

Another object is to adapt those mediums (preferably in sheet form) to accommodate stretch and change of shape in the mold without rupture within the design areas, thus eliminating defective finished articles from this cause.

This application is a substitute for my abandoned patent application Serial No. 435,053 which was filed March 17, 1942.

The objects, advantages and novel features of the invention will be apparent from the following description of an illustrative embodiment of the invention, reference being made to the accompanying drawings, wherein:

Fig. 4 is a face view of the button made in one of the molds shown in Figs. 1 to 3;

Fig. 5 is an edge view of the button shown in Fig. 4;

Fig. 6 is a back view of the button;

Fig. 7 is a face view of a button which may be similarly formed but which has or will have through openings instead of a transverse opening through a rear projection like the button of Figs. 4 to 6;

Figs. 8 and 9 are an edge view and rear view, respectively, of the button shown in Fig. 7;

Fig. 10 is an isometric view of a body-forming pellet of moldable material.

Figure 1:
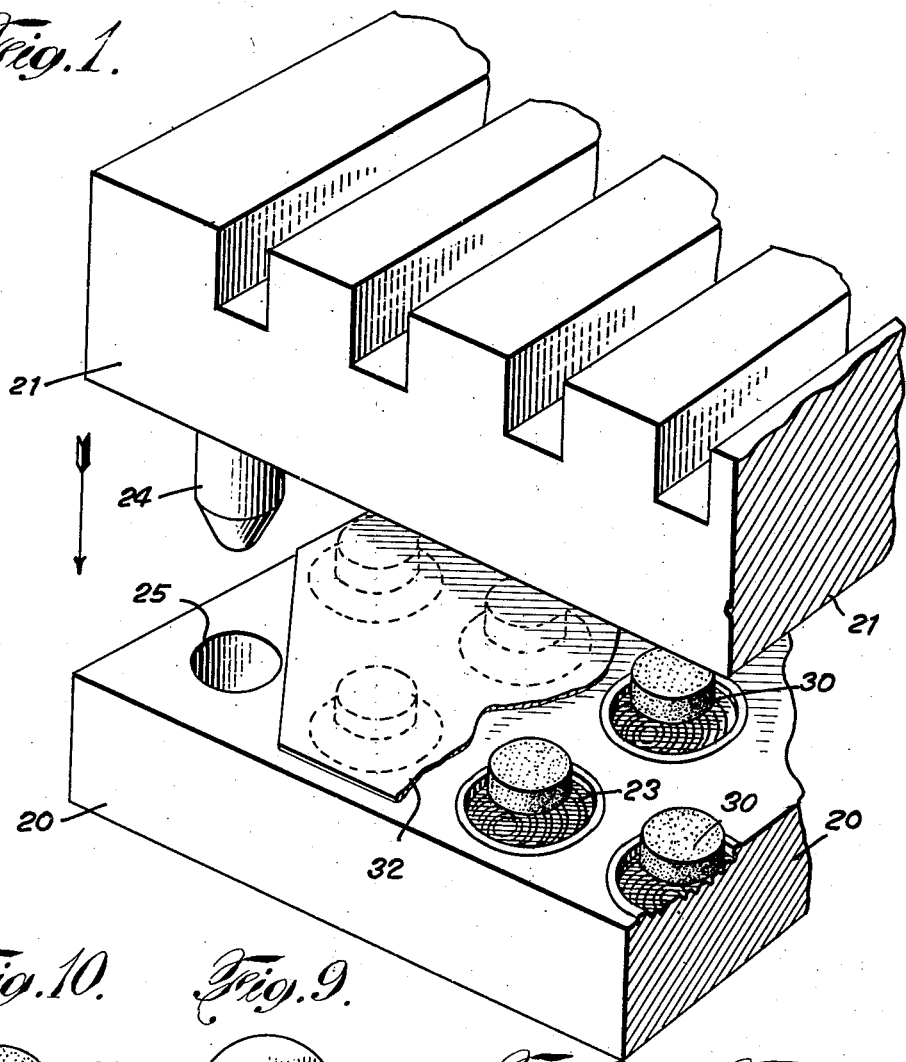
Fig. 1 is an isometric view of a multiple-mold press at the time of initial loading with body-forming pellets and a backing sheet.

Referring first to Fig. 1, which illustrates one form of apparatus by which the method of the invention can be practiced, a press or die includes a lower fixed portion 20 and an upper movable portion 21 provided with a plurality of upper mold elements 22 (Fig. 2) for the plurality of die cavities. There are complementary lower mold cavities 23 in the lower portion 20 of the die. For making the buttons illustrated, the lower mold portion is formed with cavities contoured to mold buttons with convex ribbed faces. Guide pins 24 and holes 25 on the upper and lower portions of the die cause all of the complementary mold elements 22 and die cavities 83 to register accurately when the die is closed. The mold elements 22 include cavities for rear projections on the buttons through which transverse attachment holes are made. When molded, the buttons are removed from the die.

Dies of the above described type are well known for molding buttons in multiple. The present invention merely utilizes this or other forms of multiple cavity dies as convenient means for carrying out the improved method.

Several methods have heretofore been used for the formation of surface ornamentations on articles produced wholly or partly by a pressing or molding operation. By surface ornamentation is meant each kind of effect which shows different shadings on at least the surface of an article.

The best results in regard to clearness of ornamentation or accuracy of ornament location is attained by using a surface layer as an ornamenting medium and by molding this layer to a base or body of the button or other article.

There has been no economical or satisfactory way, however, to apply this art to the molding of a plurality of ornamental articles simultaneously or to make use of this method in cases when uniformity regarding a predetermined ornament location on a plurality of molded ornamental articles is desired. One example is when a plurality of surface layers or facings with predetermined surface color ornamentations are to be molded simultaneously to a plurality of bodies and each article is intended to be identical with every other one. Heretofore it was necessary to carefully orient the individual design-bearing facings in the die cavities, and this required a great deal of painstaking labor.

No practical control existed for the location of this plurality of facings to register them accurately with a plurality of cavities of a multiple-cavity die, especially in the case of molding buttons where it is customary to mold from one hundred to three hundred pieces simultaneously.

The main disadvantages arose when a plurality of complicated shaped ornamental articles with a surface larger than the cross-sectional area of the die cavities were to be molded, because the closing of concave-shaped die cavities caused the facings to shift out of position relative to the cavities and this resulted in many calls which could not be used at all.

According to the present invention, the foregoing difficulties are avoided and it is also possible by utilizing certain features of my new method, to simplify the removing of the pressed articles from the dies and to economize finishing operations, like polishing, drilling, edging, etc.

Plastic materials, pressed into pellets 30 if desired, are placed in the cavities of the multiple-cavity die. No care is required in orienting the material or pellets in the cavities because they do not bear any means for the ornamentation of the articles.

The material or pellets may be placed in the die cavities by means of a dispenser-loading device. Such a device consists of a frame provided with a plurality of bottom openings spaced like the die cavities, and a movable bottom slide plate which closes the bottoms of the openings while the pellets are being shaken into them. The bottom openings of the dispenser are then registered with the cavities in the die and the slide plate is moved to permit the pellets to fall in the die cavities. Such dispensers are well known in the art.

After the material or pellets have been placed in the die cavities 23, a backing sheet of organic moldable material treated with a moldable plastic material is preferably placed over them. This sheet is indicated by the reference character 32. As an example, it may be formed of paper and treated with a reactive resin by impregnation. The sheet may be opaque, transparent, or translucent, depending on whether it or the underbody is to be visible after the molding operation is completed. For the present button it will be translucent after molding to reveal the color of the underbody. This sheet is placed over the pellets in such a manner that it covers all of them either wholly or partly and clears the guide pins 24.

The die is then closed to pre-shape the pellets to the contours of the mold cavities and to cause them to adhere to the back sheet 32. The time required is relatively short. With a fast-curing, thermo setting type of plastic material, a pre-shaping period of from two to five seconds is sufficient. The pre-shaping time varies with the size of the article. The sheet adheres to the pre-shaped material and to the face of the upper portion 21 of the die so that all the material rises with the upper portion of the die as the die opens. This leaves the cavities 23 in the lower portion of the die entirely clean. Even the flash which is squeezed out of the molds adheres to the sheet 32, thus greatly expediting the operations.

The backing sheet need not be used if some other expedient is employed for keeping all of the bodies in the same portion of the die; for example, the use of more heat on one portion of the die then on the other, or the use of end cuts, or the inherent shape of the button body.

Figure 2:
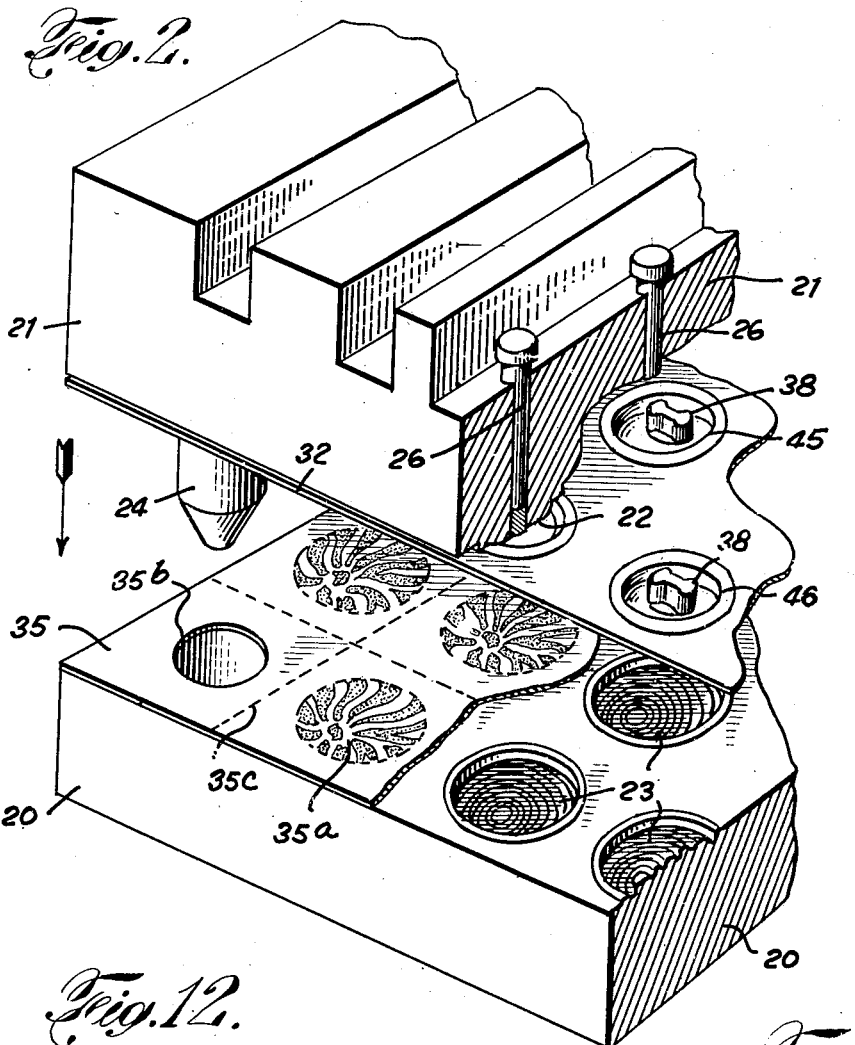
Fig. 2 is a similar view after the pellets have been shaped and made integral with the back sheet.

In Fig. 2 the sheet 32 with the adherent shaped pellets 30 is shown adhering to the upper portion of the die which is in raised position. There is then placed in the die a facing sheet 35 of organic tenacious moldable material treated with a moldable plastic material. As before, this sheet may be of paper and the treating may be provided by an impregnation. The facing sheet is provided with a plurality of deisgns 35a which have a definite predetermined position, size and orientation with reference to the die cavities and contours. Each design registers accurately with a corresponding die cavity before the die is closed. Registry may be attained by placing pre-formed holes 35b of the sheet over the registry holes 25 of the die to permit the registry pins 24 to produce the final accurate registration of the designs on the facing sheet as the die is closed.

The die is then closed and remains so for the full period required to cure the articles under heat and pressure. For example, the time may be fifty seconds at a temperature of about 320° F. The molding operation causes the shaped pellets to become integral units with portions of the backing sheet 32 and facing sheet 35, and this places the designs accurately on each article. If the same design and contour is used for each article they will all be uniform and identical.

Figure 13:
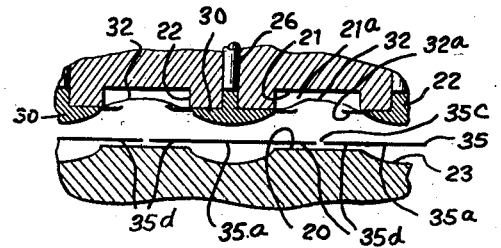
Fig. 13 is a fragmentary sectional view of the press.

The front face of the button made in the cavities 23 is very much curved and contoured and has, therefore, a surface area considerably greater than the cross-sectional area of a cavity. In the example shown, it is about 30% greater. Consequently, the facing sheet 35 must bend and give to follow the cavity contours. This draws material in from the edges and, to accommodate this stretch, the sheet is preferably weakened by scoring or serrating as at 35c to give in or tear at the weakened points 35c during the closing of the die. This tearing preferably occurs before the molds are entirely closed so that all of the design-bearing mediums 35a (Fig. 13) necessary to cover the desired parts of the article 30 are in the die cavities before full pressure is applied. To attain this, it is not only necessary to have the facing sheet weakened, but the mold elements 22 must be so dimensioned that recesses 21a between these mold elements are remote enough from the opposite portion 20 of the die to provide clearance for the flash 30a which, after the first pre-shaping operation, adheres to the backing sheet 32. If this clearance between the upper and lower portions of the die, in the regions outside the mold areas, were not provided, the tearing at the weakened portions 35c of the facing sheet would be retarded and in some cases prevented.

The scoring shown is in squares but it may be in circles around the designs, or the sheet may be skeletonized between designs to provide stretch and to save impregnation material. The backing sheet alone will hold the assembly together after molding, but it too may be skeletonized to save impregnation material.

Figure 3:
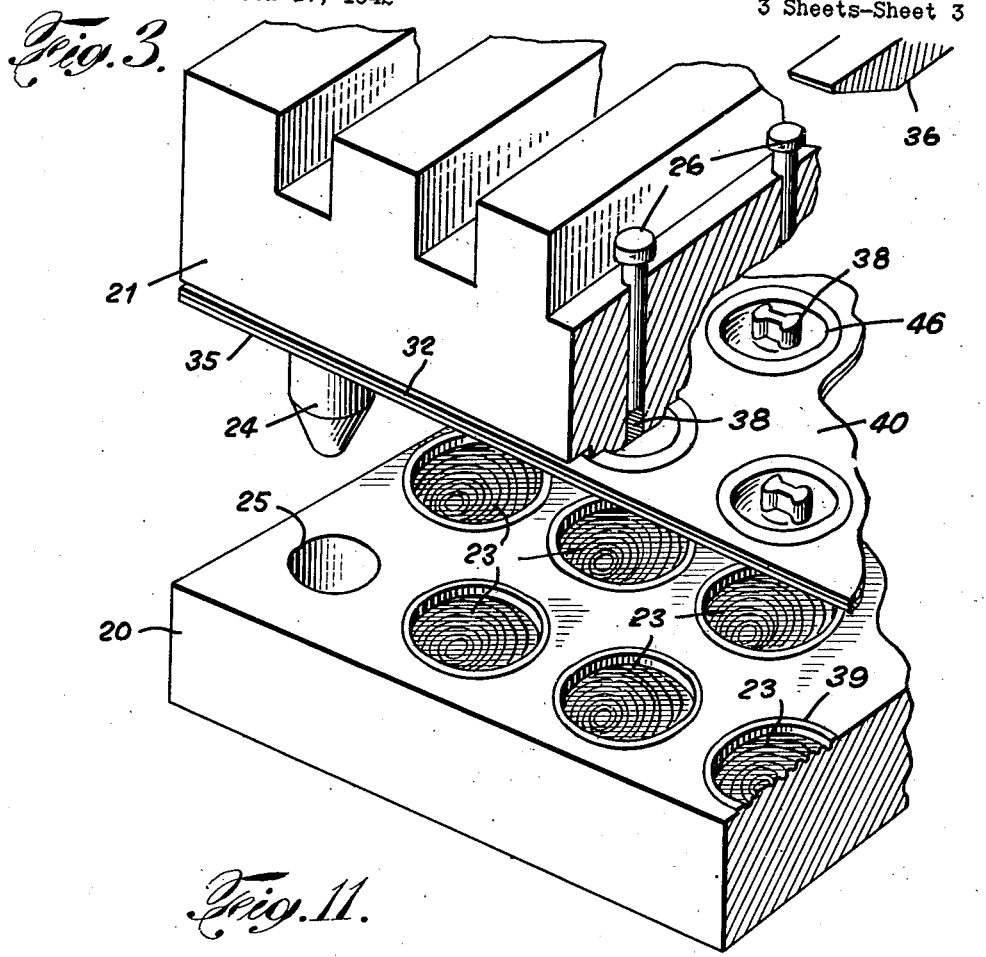
Fig. 3 is a similar view after the molding operation has been completed and just before removal from the press.

After molding, the shaped material or pellets and all flash material is disposed between the two sheets 32 and 35; and the entire assembly rises with the upper portion 21 of the die, as shown in Fig. 3. Ejector pins 26 act through the rear projections 38 of the buttons to discharge all buttons and the sheets as a unit from the die. It will be noted that the space between cavities is below rims 39 of the cavities 23 so the connecting portions of the sheets will not be cured; also that the rims 39 are flat so they will not cut through the sheets. Consequently, the finished sheet assembly has considerable tenacity and the buttons are securely and accurately held together.

As can be seen from the above description, the use of connected surface layers not only provides a practical means to produce predetermined uniform ornamental facings on a plurality of molded articles, but it also converts a plurality of molded articles into a unit. This eliminates time losses which occurred when a plurality of articles were pressed and adhered after the pressing operation to different parts of the die so that the ejector pins became useless and the buttons or other articles had to be picked out singly.

Furthermore, the articles, being connected with each other and being spaced in accurate correspondence with the die cavities, after the molding operation is finished and they are removed from the die, may be placed in processing machines which include multiple tools spaced like the die cavities to act upon all or a part of the articles in a single cycle, or the sheet may be shifted bodily with all articles by a given amount for successive operations. Because of this the operations may be largely automatic, which not only obviates the expense and loss of time incident to individual finishing operations but also provides greater precision, characteristic of the substitution of machine operations for free-hand operations.

Figure 11:
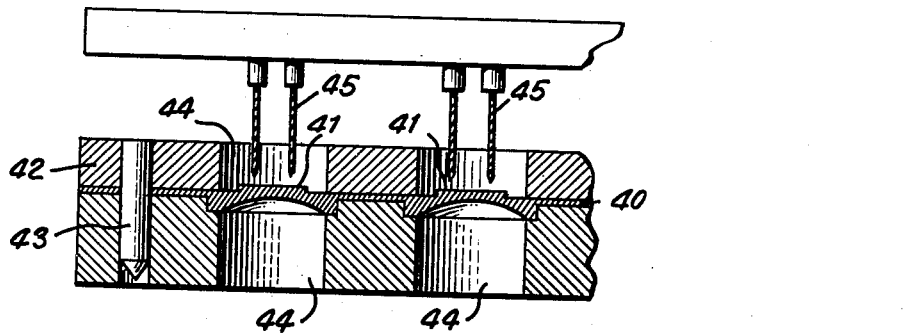
Fig. 11 is a sectional view illustrating how multiple drilling operations may be performed on the buttons while still attached to a backing sheet.

In Fig. 11 there is shown a composite sheet 40 with molded buttons 41 secured in a clamp 42 provided with registry pins 43 and having openings 44 providing working access to the buttons. Thus clamped, the buttons may be polished on the faces, drilled by multiple drills 45, as shown, or otherwise processed. One of the through-hole buttons shown in Fig. 11 is shown in detail in Figs. 7, 8 and 9. The button 46 shown in Figs. 4, 5 and 6 is the same as that shown in the final molding operation in Fig. 3.

Figure 12:
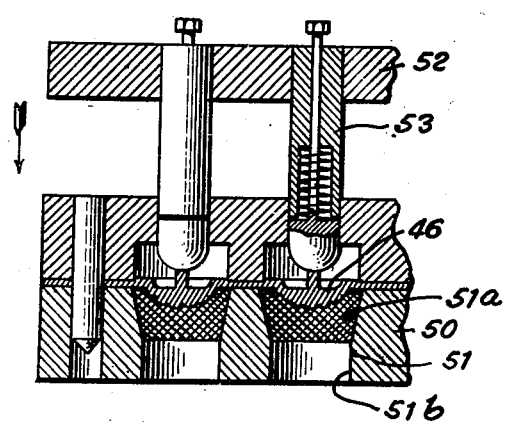
Fig. 12 is a sectional view illustrating how the buttons may be punched from the sheet and their edges polished.

After all desired finishing operations have been performed on the buttons they are ready for removal from the sheet. Again they may be operated upon in multiple. As shown in Fig. 12, the sheet with the still-attached buttons 45 is placed in a form 50 having through openings 51 spaced like the cavities of the die, and a head 52 having similarly spaced pins 53 is brought down to force the buttons through the openings 51. The openings may be of simple form for merely separating the buttons from the sheet but, as shown, the openings are formed with an oversize tapered upper portion 51a with a file-like interior roughening for cutting the buttons from the sheet; and with a restricted straight or slightly tapered lower portion 51b for polishing the edges of the buttons and bringing them to accurate size. This is important with coated articles because it is difficult in hand-edging operations to attain a uniform size and to avoid cutting through or too deep into the coating so that the interior is exposed.

In my patent application, Serial No. 313,649, filed January 14, 1940, particular attention was given to the feature of providing a flexible facing layer just before the die is closed. Also in the present invention, it is preferred to have the sheets in a flexible condition just before the die is closed on them, so that they will bend easily to follow the contours of the mold without tearing. The sheets may be kept flexible by heating just before pressing or by the use of softening agents suitable in type to restore or preserve the flexibility.

The moldable materials used are those organic substances which are generally referred to as of the thermoplastic or thermosetting type and which, preferably in solution or dispersion form, will properly impregnate, coat and integrate with other materials. To indicate the class, reference is made to all kinds of condensation products such as phenol, urea, thiourea, melamine, natural or artificial resins with formaldehyde or similar substances, plastics of casein, cellulose, or cellulose derivatives. The enumeration of these substances is not intended to limit the invention, other organic plastic substances being subject to use so far as suitable with the various aspects of the invention.

The moldable tenacious organic sheet material or the ornament-forming surface layers may be of any type which will not flow in the mold to lose its sheet form and/or color design. Besides paper, there may be mentioned fabric, cellulose, leather, all types of rubber compounds, hardened thermoplastic or thermosetting material, metal sheets, etc.

The body-forming moldable material may be of thermoplastic or thermosetting type, cured or uncured, in powder or pre-compressed form, in general, any kind of material which will properly integrate with the facing material.

The design may be applied to the design carrier by printing, photographic, or other known methods.

It will be seen that the invention provides an improved method and apparatus for manufacturing a plurality or ornamental molded articles consisting of a body portion and an ornamental facing, whereby a plurality of facings are simultaneously applied to a plurality of bodies. While one embodiment of the invention has been described in detail to enable others to reproduce the benefits, it will be understood that the invention may have other embodiments.

Terms of orientation are of course relative. Various changes and modifications can be made, and some features of the invention can be used in different combinations without departing from the invention as defined in the claims.

I claim as my invention:

1. The method of producing a plurality of molded articles such as buttons with a predetermined surface color design which comprises, placing pellets of moldable material in the lower portions of spaced molds in a common face of a multiple-mold press, placing a backing sheet of fibrous material treated with moldable material over the pellets, closing the mold for a relatively short time to shape the pellets and affix them to the backing sheet, opening the press to separate the backing sheet and attached pellets from the face-molding portions of the molds, locating a design in registry with each of the respective molds by placing in the press a facing sheet consisting of fibrous material treated with moldable material and having the designs for the articles on said facing sheet and over the respective molds, closing the press to cure the articles and to make them integral with those parts of the backing and facing sheets covering the molds, and then opening the press to remove the articles.

2. The method of producing in a multi-cavity die a plurality of molded articles such as buttons with a predetermined surface design which comprises, putting pellets of moldable material into face-molding portions of spaced mold cavities in a common face of the multiple-cavity die, placing a backing sheet over the pellets, closing the die for a relatively short time to shape the pellets into molded articles and affix them to the backing sheet, opening the die to separate the backing sheet and attached articles from the face-molding portions of the die, locating a design in registry with each of the respective mold cavities, by placing in the die a facing sheet that includes a moldable material and that is provided with the plurality of designs for the articles in register with the respective mold cavities, closing the die, and thereby returning the articles to said face-molding portions of the die, to cure the articles and to make them integral with those parts of the backing and facing sheets that register with the respective die cavities, and then opening the die to remove the articles.

3. The method of producing a plurality of molded articles with predetermined surface color designs over an enlarged face of greater area than the cross-sectional area of the mold cavities, which method comprises, placing pellets of moldable material in the lower portions of spaced molds that are located in a common base of a multiple-cavity die, placing a backing sheet of fibrous material treated with moldable material over the pellets, closing the die for a relatively short time to shape the pellets into molded articles and affix them to the backing sheet, opening the die to separate the backing sheet and attached articles from the face-forming portions of the molds, placing in the die a facing sheet consisting of fibrous material treated with moldable material, the facing sheet being provided with a plurality of designs for the articles, with each design registered with a respective mold cavity, the facing sheet also being formed with a weakened tear line around each mold cavity to provide for stretching in the molds over the enlarged surface area of the articles, closing the die to cure the articles and make them integral with those parts of the backing and facing sheets that register with the respective mold cavities, and then opening the die to remove the articles.

4. The method of simultaneously producing a plurality of molded articles with predetermined surface designs covering a face of greater area than the cross-sectional area of mold cavities in which the articles are made, which method comprises placing pellets of moldable material in the face-molding portions of the mold cavities that are located in a common face of a multi-cavity die, placing a backing sheet over the pellets, closing the die long enough to shape the pellets into molded articles and to affix them to the backing sheet, opening the die to withdraw the articles from the face-molding portions of the mold cavities, placing in the die a facing sheet containing moldable material and a plurality of designs for the articles, with each design in position to register with one of the mold cavities, the facing sheet being formed with a weakened tear line around each mold cavity to provide for stretching in the cavities over the enlarged face areas of the articles, closing the die, and thereby returning the articles to said face-molding portions of the cavities to cure the articles and make them integral with those parts of the backing and facing sheets that register with the respective mold cavities, and then opening the die to remove the articles.

5. The method of producing a plurality of articles with surface layers which comprises, supplying a plurality of mold cavities that are located in a common face of a multiple-cavity die, with moldable materials, placing a backing sheet consisting of moldable material in the die, closing the die to shape the articles and affix them to the backing sheet, opening the die to separate the backing sheet and preformed articles from one side of the die, placing in the die a surfacing sheet that overlies a plurality of mold cavities and provides a surface facing large enough to cover at least the desired portion of the respective mold cavities, closing the die, and thereby returning the articles to the mold cavities to force the surfacing sheet and articles firmly together with the articles in their respective mold cavities to make the articles integral with those parts of the backing sheet and surfacing sheet covering the mold cavities, and opening the die to remove the articles.

6. The method of producing a plurality of molded articles with predetermined surface color designs which comprises, preparing on a surfacing sheet a plurality of designs so spaced from each other that, allowing for subsequent alterations in the size and shape of said sheet, each of said designs will register with a mold with substantial accuracy, treating said sheet with a thermosetting material, preshaping and attaching a plurality of elements of article-forming moldable material to a backing sheet of moldable material in a multiple-cavity die that has cavities for each article located in a common face of the die, the preshaping operation leaving said elements with their faces exposed away from the backing sheet, opening the die to expose the faces of the thus preshaped elements, placing the treated design-bearing sheet in the die with each design registered with a mold cavity, the facing sheet also being formed with a weakened tear line around each design to provide for stretching in the mold cavity, returning the elements to the mold cavities and closing the die to force the design-bearing sheet and articles together with the articles in their respective mold cavities, and molding and curing the pre-shaped elements with the sheets.

LEOPOLD KARNIOL.

References Cited in the file of this patent

UNITED STATES PATENTS

| Number | Name | Date |
|---|---|---|
| 343,309 | Halstead | June 8, 1886 |
| 1,301,069 | MacDonald | Apr. 15, 1919 |
| 1,552,907 | Binmore | Sept. 8, 1925 |
| 1,773,377 | Roberts | Aug. 19, 1930 |
| 2,263,792 | Wood | Nov. 25, 1941 |